(12) United States Patent
Williams et al.

(10) Patent No.: US 9,066,553 B2
(45) Date of Patent: Jun. 30, 2015

(54) ADVERTISING HEADPIECE

(76) Inventors: Gary Donald Williams, Decatur, GA (US); Nathaniel H. Bronner, Atlanta, GA (US)

( * ) Notice: Subject to any disclaimer, the term of this patent is extended or adjusted under 35 U.S.C. 154(b) by 385 days.

(21) Appl. No.: 13/344,622

(22) Filed: Jan. 6, 2012

(65) Prior Publication Data

US 2013/0174322 A1    Jul. 11, 2013

(51) Int. Cl.
*G09F 3/00* (2006.01)
*A42B 1/24* (2006.01)
*A42B 1/20* (2006.01)
*G09F 21/02* (2006.01)

(52) U.S. Cl.
CPC .............. *A42B 1/248* (2013.01); *G09F 21/02* (2013.01); *A42B 1/208* (2013.01); *G09F 21/026* (2013.01)

(58) Field of Classification Search
CPC ....................................... G09F 21/02
USPC ............ 40/329, 310, 539, 607.03, 311; 2/12, 2/209.3, 200.3, 209.7
See application file for complete search history.

(56) References Cited

U.S. PATENT DOCUMENTS

| | | | | |
|---|---|---|---|---|
| 1,996,254 A | * | 4/1935 | Parlow | 2/209.7 |
| 4,747,164 A | * | 5/1988 | Foulke | 2/209.3 |
| D403,141 S | * | 12/1998 | De Lozada et al. | D2/875 |
| 6,910,225 B2 | * | 6/2005 | Kovalenko | 2/200.3 |

* cited by examiner

*Primary Examiner* — Syed A Islam
(74) *Attorney, Agent, or Firm* — Baxam Law Group, LLC; Deanna L. Baxam

(57) ABSTRACT

A headpiece that provides shade, which also includes one or more areas carrying readable information that is intended to be communicated to persons viewing the headpiece while it is being worn by a wearer.

7 Claims, 6 Drawing Sheets

ADVERTISING HEADPIECE

CROSS-REFERENCE TO RELATED APPLICATIONS

There are no previously issued or pending related applications.

TECHNICAL FIELD OF THE INVENTION

The invention relates to headwear that serves the dual purpose of shade covering and the transmission of information, such as advertising.

BACKGROUND ART

The invention provides a significant development in the field of headwear which has until now not been previously recognized. Until now, articles of headwear have been purposed primarily on their usefulness as coverings for the head to provide shade or for reasons of fashion. Only in an incidental manner have some items, such as baseball caps, included the limited presence of indicia communicating various concepts, for example showing fan loyalty (e.g. sports team names) or brand advertising.

U.S. Pat. No. 1,418,198 (Neppell) discloses a hat that can be adjusted to fit the size of the head. It has a brim with bendable tongues formed as part of the brim that fit into slits in the crown portion, which is a flat piece. Radial slits are cut into the front and rear inner edges of the brim.

U.S. Pat. No. 1,996,254 (Parlow) discloses a hat formed as a single, flat piece made from a semi-rigid material such as cardboard. The semi-rigid material is capable of being slit in a simple die-cutting operation to form a flat piece (blank) which can be distorted into a hat shape, as shown below. The slits are arranged in the center of the blank to form the crown of the hat. The slits form a honeycomb-like lattice in the crown when it is fully extended.

U.S. Pat. No. 548,846 (Bianchetti) describes a collapsible circular headpiece having a perimeter formed from coiled spring wire formed into a circular loop. The brim portion is covered in fabric, mesh or protective material, and it is connected to a ridge that defines an open center in the middle of the headpiece. Additional fabric or protective material can be attached by fasteners to the outer edge of the brim to form a drape that falls vertically over the head and neck of the wearer.

U.S. Pat. No. 1,486,098 (McGaffey) discloses a sunshade for hats with a flat, straight brim, such as a straw hat. It functions to extend the brim of the hat to provide additional shade for the wearer. The sunshade is made from a single piece of material, such as paper, and is cut in a circular brim configuration with a circular opening at the center, and with an extended, foldable piece that is cut in the identical dimensions of a portion of the brim so that when it is folded under the brim it forms a mirror image and conforms to the shape of the brim.

U.S. Pat. No. 2,682,666 (Mayer) describes a conical paper hat fully covering the head of the wearer and having an erect portion that extends upward and rearward from the apex or top point of the hat.

U.S. Pat. No. 5,010,590 (Haber) discloses a visor-cap die-cut from a single piece of material that includes a front bill portion, and a folded display panel that is elevated above the bill.

U.S. Pat. No. 574,325 (Hartsock) describes a hat mark consists of a discrete circular card with identifying information printed on it, which is then inserted into a metal label holder, which is in turn intended to be inserted into the sweat band of a hat.

The prior art has not satisfied the need for a lightweight, one-piece wearable headpiece that can suitably carry and convey a large amount of information while at the same time providing shade cover and fashion enhancement to the wearer.

SUMMARY OF THE INVENTION

The present invention provides a solution to the need for a wearable headpiece that enables the publication and easy read-access of information over a majority of its surface, such information intended to be communicated to viewers of the headpiece in whatever venue in which it is worn, while at the same time providing shade to the wearer. In this respect, the invention comprises a lightweight, one-piece, wearable headpiece that includes relatively large areas of its surfaces for the purpose of bearing and presenting readable information of different types without impeding the maximum surface area available for communicating readable or otherwise visible content. The information thus presented may be viewed from multiple angles, such as from above or below, as may for example be the case in a stadium environment with riser seating; and optionally also from a co-planar perspective at eye level.

More specifically, the invention comprises a wearable headpiece comprising a planar outer portion; an inner rim portion, at least a portion of the circumference of which defines a center opening; a flexible band portion disposed between the planar outer portion and the inner rim portion; wherein the planar outer portion includes an upper side and an under side thereof and an outer edge that defines the outer edge of the headpiece. The circumference of the outer edge of the planar outer portion is sufficient to provide an area of shade that covers the face and neck of a wearer wearing the headpiece. The inner rim portion comprises an inner edge, the circumference of which defines a center opening to accommodate the head of the wearer, and is connected to the planar outer portion by the flexible band portion; and the flexible band portion comprises adjustment means for fitting the headpiece to the wearer's head, said adjustment means comprised of proportionately spaced notches sized and positioned to render the flexible band portion adjustable to accommodate the size and shape of the wearer's head while maintaining the inner rim portion in an erect position and angled in relation to the planar portion while the headpiece is being worn. The one or more portions of the headpiece include readable information; and the headpiece is disposed to be adjustably mounted on the head of a wearer to provide shade and to display the readable information.

The invention may be used as a cheap and effective means of mass communication of information or advertising.

DESCRIPTION OF THE EMBODIMENTS OF THE INVENTION

Figure 1:
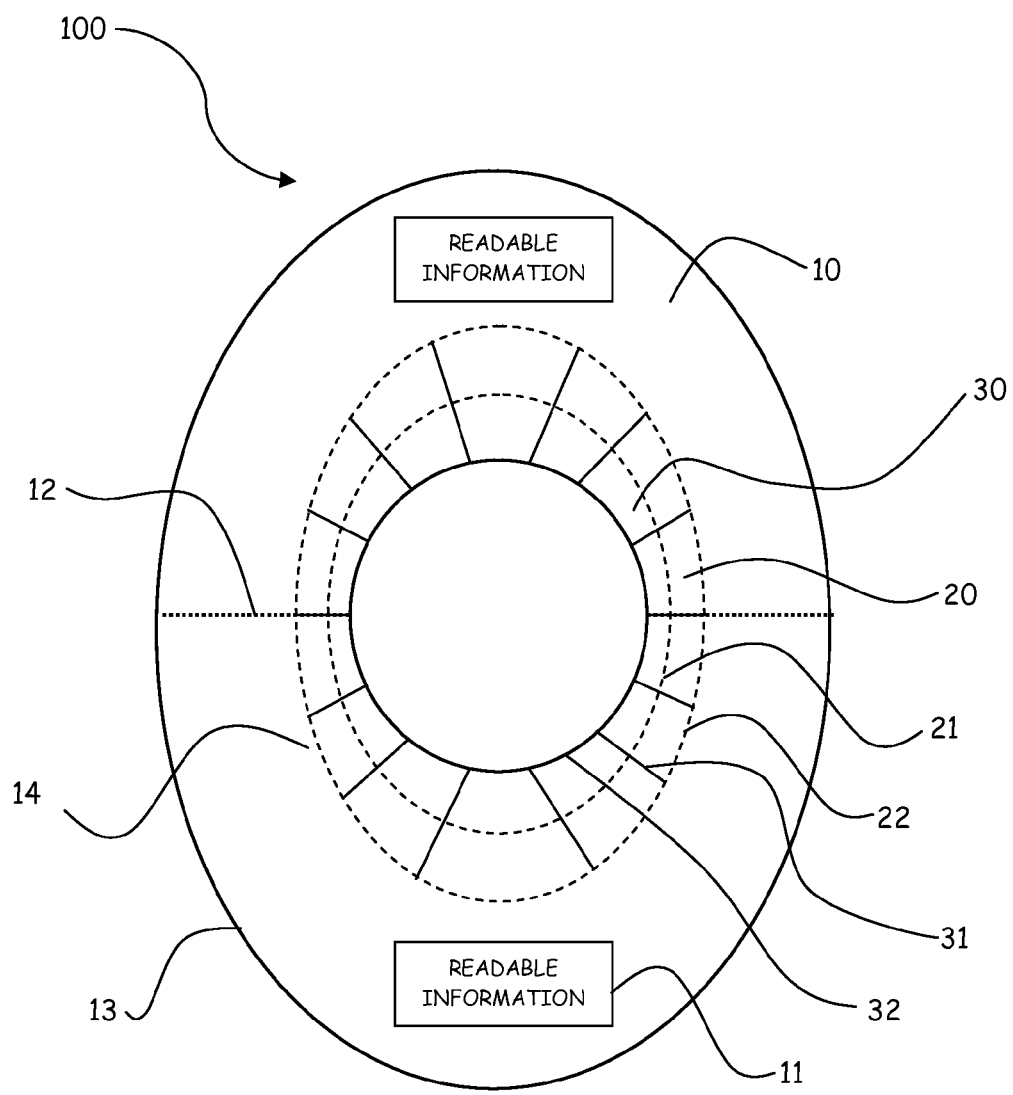
FIG. 1 is a planar, representation of an embodiment of the invention, demonstrating certain required and optional elements thereof.
Figure 2:
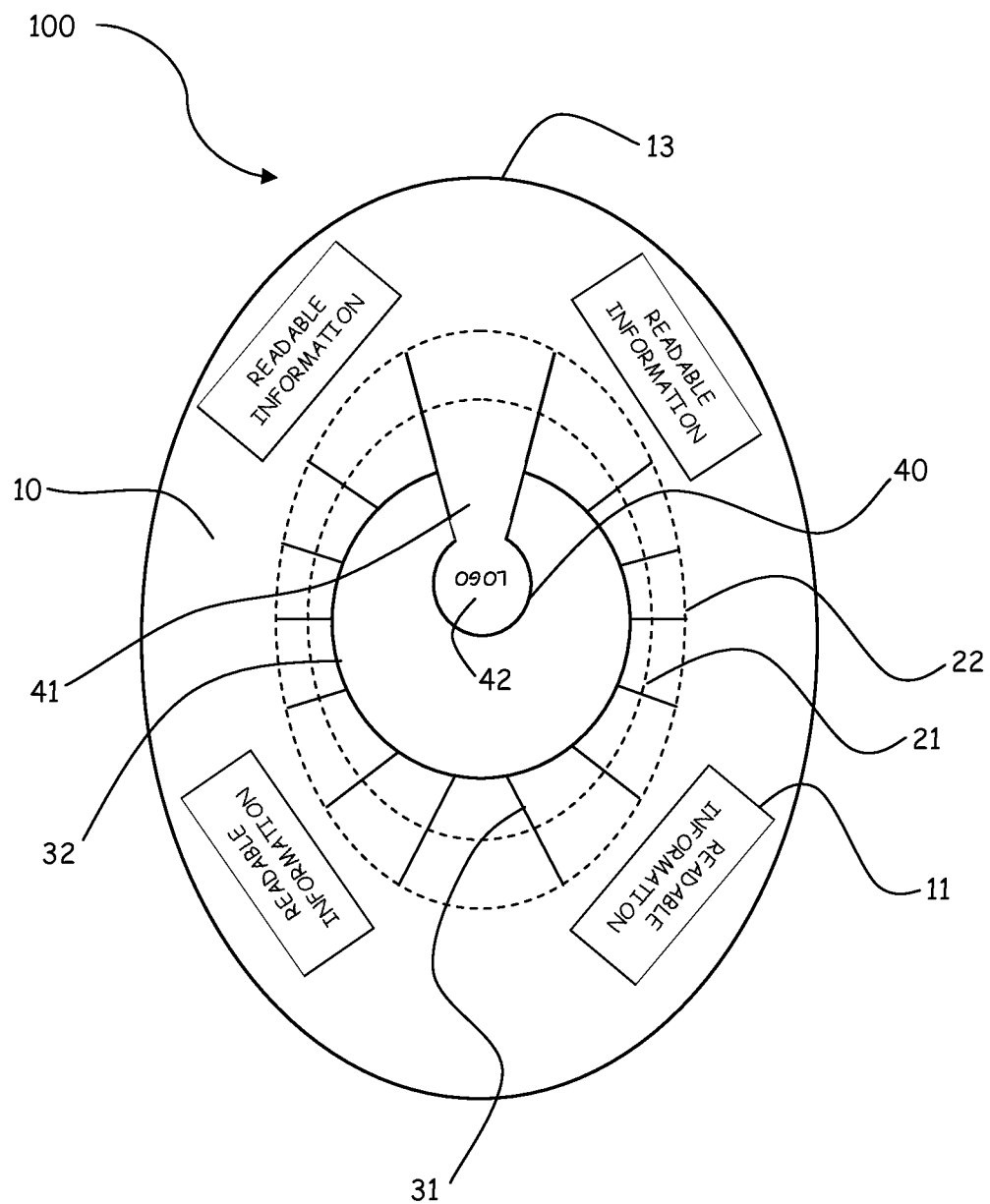
FIG. 2 is a planar representation of a particular embodiment of the invention which includes a tab portion integrally formed with the inner rim portion thereof to provide an additional advertising means.
Figure 3:
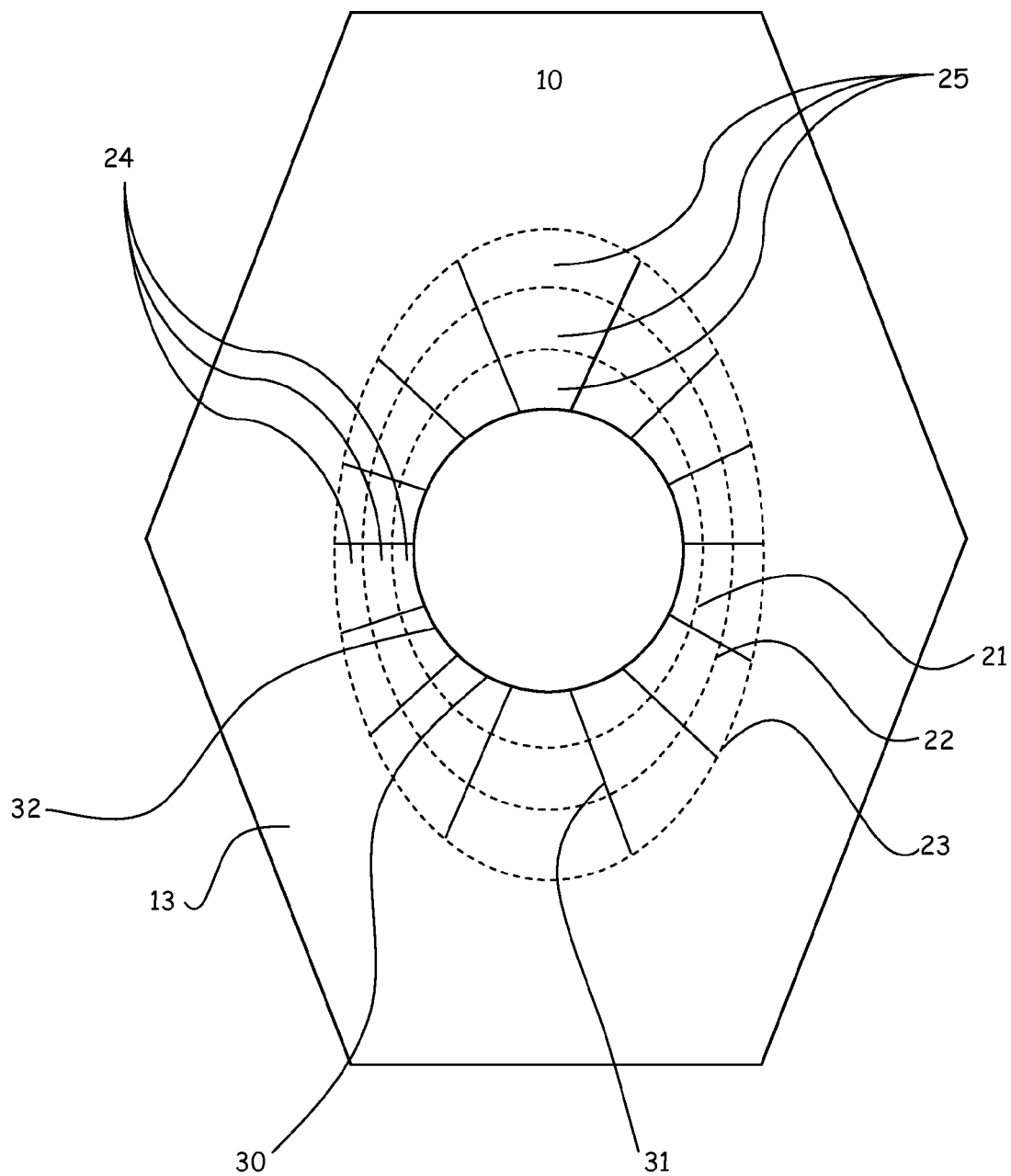
FIG. 3 is an alternative planar representation of a headpiece of the invention having a planar portion with an angular shaped outer edge configuration.

According to the various embodiments contemplated herein and as demonstrated in the accompanying figures, the invention provides a crownless wearable headpiece 100 that is suitable for displaying large amounts of readable or other visual information while it provides the utility of shade and protection from the sun for the wearer. As shown in FIGS. 1-3, the invention comprises, as features, a planar portion 10, an inner rim portion 30 and a flexible band portion 20 which is connected and relates to both planar portion 10 and the inner rim portion 30. The planar portion 10 is characterized by spatial dimensions of sufficient length and width to provide a penumbra of shade around the head, face and neck of the wearer. At the same time, the planar portion 10 comprises one or more large, uninterrupted surface areas of varying size that are suitable for printing, superimposing or otherwise affixing information readable information 11 for the purpose of communicating information or advertising goods or services. The term "readable information," is intended to include information that may be read, viewed or scanned by human, mechanical, digital or optical means. In this regard, readable information includes but is not limited to information that can be viewed and interpreted as printed text or graphics by the human eye; or information which can be read and interpreted by hand-held communication devices, cameras or other monitoring devices, for example bar codes, quick response (QR) codes, and radio-frequency identified (RFID) labeling.

The outer edge of the planar portion 13 may define a circular or oval shape, or any other shape suitable for the intended purposes as described above. For example, the shape of the planar portion and its outer edge may be circular, square or polygonal, or it may take the shape of an object such as a football, soda can or an animal or cartoon character depending on the advertising or marketing effort for which the headpiece is being used. Regardless of the shape conveyed by the conformation of the outer edge, the planar portion will have an adequate area of uninterrupted space to allow for affixing of the readable information.

The planar portion 10 may optionally also include pre-scored fold lines 12 that allow the headpiece to be folded for shipping, storage and transport when not being worn. According to the example of FIG. 1 the folds may be scored across the center of the planar portion so that the headpiece can be folded in half, however it should also be appreciated that the fold lines 12, if incorporated into the construction of the invention, may be interposed at other locations and in varying numbers about the planar portion 10.

The planar portion is connected to an inner rim portion 30 by means of a flexible band portion 20 which is interposed between the planar portion 10 and the inner rim portion 30. This flexible band portion 20 is contiguous, and in the flattened storage position is also co-planar, with the innermost region of the planar portion, which is identified in FIG. 1 as element 14. As shown in FIGS. 1, 2 and 3, the band portion 20 is formed by one or more rows of scoring 21, 22, 23 that are disposed in a generally oval configuration around the circumference of the innermost planar region 14. In certain embodiments, the placement of the rows of scoring may be in a more circular configuration, however generally an oval configuration is useful to aid the fitting of the headpiece 100. The inner rim portion 30 is formed between the inner rim edge 32 and the innermost row of scoring (for example element 21 of FIG. 1) of the flexible band portion 20. The placement of the scoring lines 21, 22 result in a flexibility that allows the band portion 20 to be movable in relation to the planar portion 10. The scoring is done by conventional means, for example by cutting through some but not all the layers of the base material used for forming the headpiece. The dimensions of the planar portion 10 may vary depending on the rigidity of the base material used for construction of the headpiece. In some exemplary embodiments the width between the inner rim edge 32 and the outer edge 13 may range from approximately 4 to approximately 10 inches or more.

The spacing between the one or more rows of scoring 21, 22 is variable around the circumference of the innermost planar portion 14 so as to enable the headpiece 100 to be adjusted for a snug but comfortable fit around the head of the wearer. In this regard, the rows of scoring 21, 22 are disposed closer together, in parallel, in the sections of the flexible band portion 20 that are disposed to fit approximately along the sides of the wearer's head, and disposed further apart, while still in parallel, in the sections of the portion 20 that are intended to fit approximately alongside the front and back of the wearer's head. For example, according to one preferred embodiment of the invention the rows of scoring 21, 22 are separated by an interstitial distance of from approximately 0.5 to 1.5 inches, shown on FIG. 6 as elements 24 along the side areas, and by a distance of from approximately 1.0 to 2.0 inches, denoted by elements 25, along the front and rear side areas.

Figure 4:
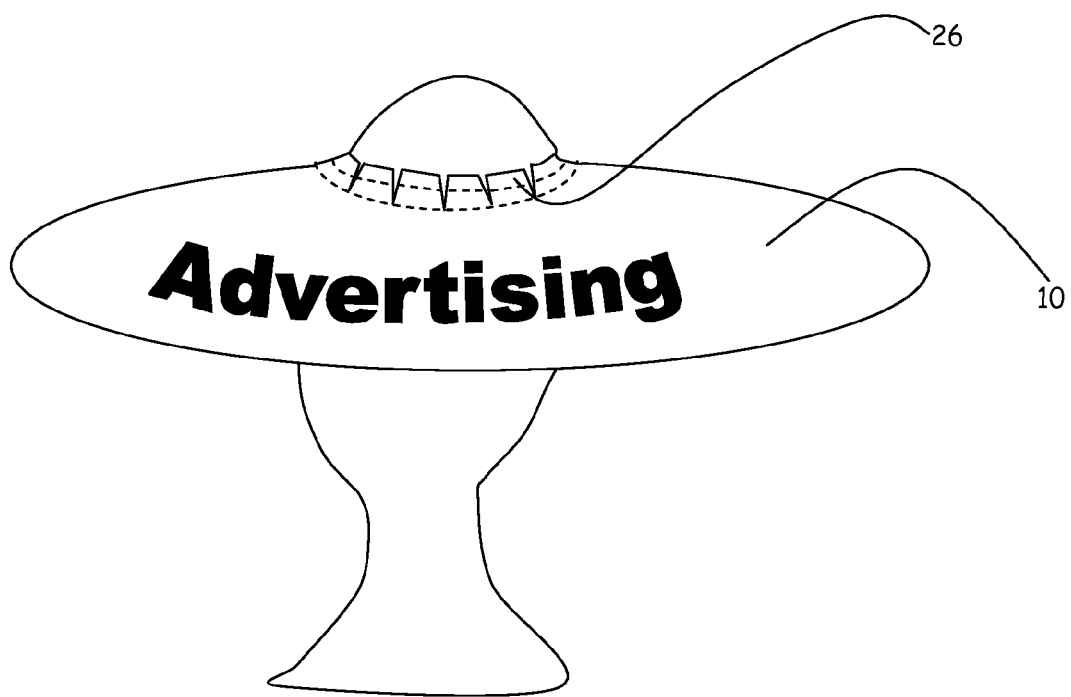
FIG. 4 is a perspective view of a headpiece according to the invention as it is intended to be worn by the wearer.
Figure 5:
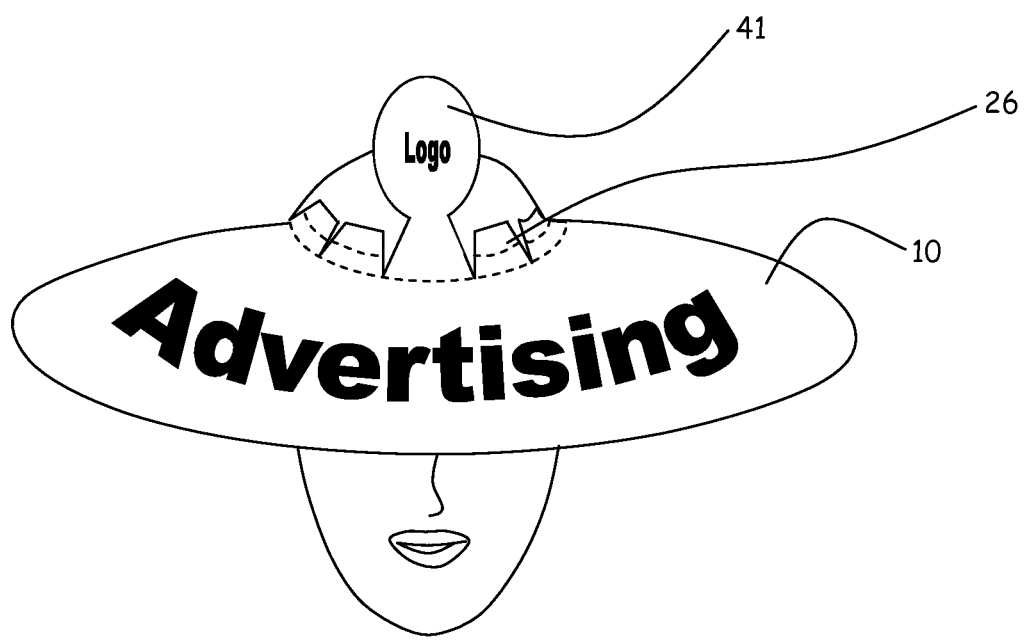
FIG. 5 is a perspective view of a headpiece according to the invention as it is intended to be worn on the head of the wearer, which further includes an extended tab portion that provides additional means for displaying readable information.

As shown in FIGS. 1-3, the flexible band portion 20 is interrupted by a series of one or more notches 31 that are perpendicularly positioned in relation to the linear orientation of the rows of scoring 21, 22 and 23. The notches 31 are suitably spaced at intervals to aid the flexibility of the band portion 20, however the total number may be limited to maintain the rigidity of the band area in order to provide the tension needed for a snug fit. The notches 31 are sufficient in number to enable the inner rim edge 32 to be flexibly expanded to the crown size of the wearer, as too many notches can compromise the stability of the inner rim edge 32. As shown in FIGS. 4 and 5, the areas between the notches 31 are designated as tabs 26. When the headpiece 100 is placed over the head of the wearer, the tabs 26 are displaced to a position that is angled obliquely or perpendicularly to the planar portion 10. In certain preferred embodiments of the invention, an additional portion of the base material may be formed into an extended tab portion 41 which is larger and longer than the tabs 26. Extended tab portion 41 is further disposed to be elevated over the planar portion 10 and the flexible band portion 20 so as to at least partially obscure the head of the wearer without forming a cover or a hat crown. In this manner, when the headpiece 100 is worn, the extended tab portion 41 is readily visible at eye levels by persons who encounter the wearer at eye level, as shown in FIG. 5. This extended tab portion 41 may for example include readable information, such as an advertising logo, an image, a bar code or readable text.

Figure 6:
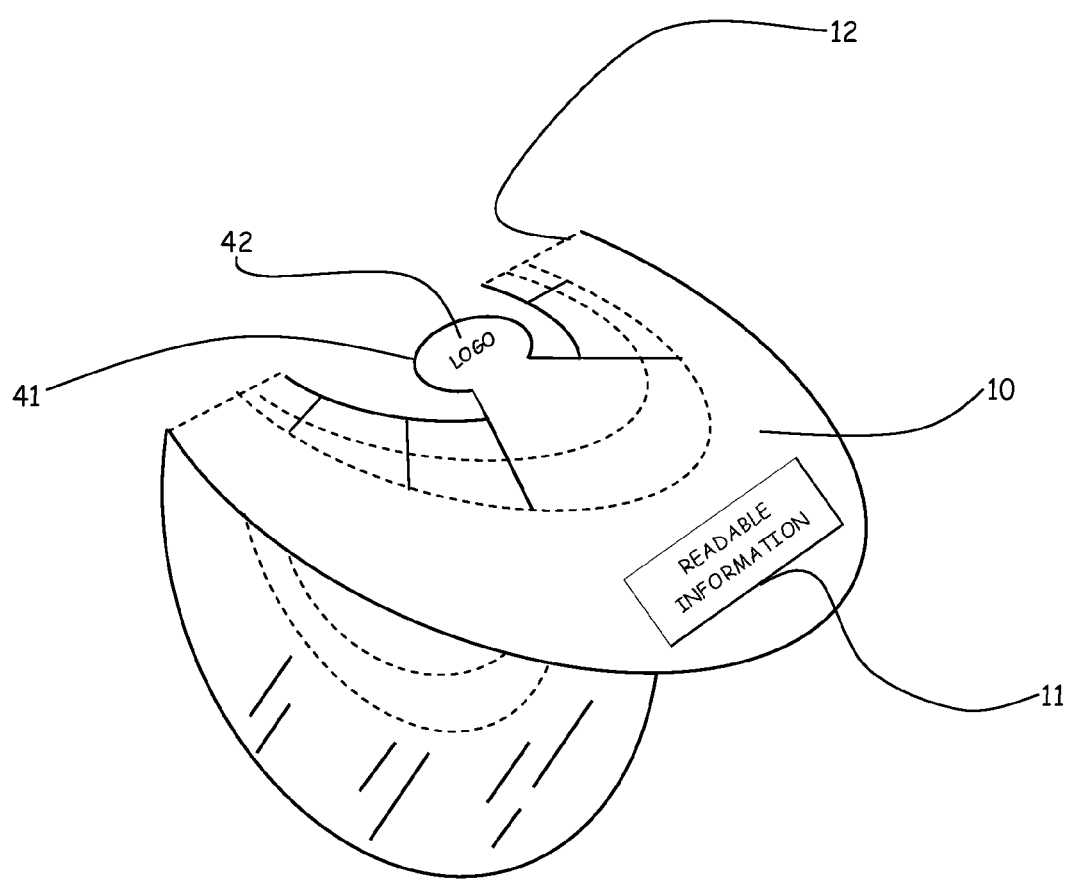
FIG. 6 shows an alternate view of a headpiece according to the invention which has been partially folded along center fold lines.

The headpiece 100 may be formed from a base material that is rigid or semi-rigid yet capable of bending, scoring or creasing and which may be perforated by any conventional means. The base material should also suitably be lightweight and capable of being imprinted, superimposed or otherwise appended with readable information, which may include but not be limited to text, graphics, pictures, and two- or three-dimensional objects which may be used to attract attention to the headpiece and communicate information to persons who encounter the wearer. Some examples of base materials include paperboard, plastic, foam board, lightweight composite materials, or fabric-covered materials. The shape of the headpiece may be formed by cutting or stamping from a template onto a contiguous sheet of base material in one or more steps to form the basic shape and add the rows of scoring and the notches. The readable information may be added to the shape before or after cutting or scoring, for example by printing, stamping, gluing or fusing the information onto the various portions of the headpiece. Non-limiting examples of printing techniques that may be used include offset, flexography, screen printing, digital press, chromolithography and 3-D printing. Readable information of various types may be placed on either side of the planar portion 10 such that it is visible from above or below the eye-level plane of the wearer (e.g. FIG. 4), and additionally on the flexible band portion 20, the tab portions 26 or the extended tab portion 41 (FIG. 5). In certain embodiments, the headpiece may also be folded for shipping, storage and carrying, as shown in FIG. 6.

INDUSTRIAL APPLICABILITY

The invention, while providing shade to the wearer, also provides a cheap and effective means of communicating information to large groups of people, and its portable nature ensures that as the wearers move about and interact with others, the information can always be transmitted to new viewers. The configuration of the readable information on the headpiece also allows it to be viewed at multiple angles by viewers positioned at different locations in relation to the wearer of the headpiece, for example via the placement of the seating arrangements in a stadium or arena.

The headpiece of the invention may be used to advertise goods and services at events such as sporting events, festivals or conventions, and in this respect may be customized to accommodate the desired promotional messaging. It may also be used for educational purposes. Because it is adjustable, its construction can accommodate a range of head circumference and therefore it can be but is not required to be manufactured in multiple sizes. In preferred embodiments, the headpiece is constructed of fully or partially recycled or recyclable materials, such as recycled paperboard, plastic or fiberglass materials.

The foregoing description of specific embodiments is not intended to be limiting on the scope of this disclosure, but rather to be illustrative of the broad concepts embodied by this invention.

The invention claimed is:

1. A wearable, foldable advertising headpiece comprising a planar outer portion; an inner rim portion, the circumference of which defines a center opening; and a flexible band portion disposed between the planar outer portion and the inner rim portion; wherein:
   a. the planar outer portion includes
      i. an upper side and an under side thereof; and
      ii. an outer edge that defines the outer edge of the headpiece, wherein the circumference of the outer edge of the planar outer portion is sufficient to provide an area of shade that covers the face and neck of a wearer wearing the headpiece and to provide sufficient surface area to accommodate the affixing of readable information; and
      iii. readable information that can be viewed or scanned by human, mechanical, digital or optical means, affixed to the upper and under side of the planar outer portion;
   b. the inner rim portion comprises an inner rim edge, the circumference of which defines a center opening to accommodate the head of the wearer, and is connected to the planar outer portion by the flexible band portion; and
   c. the flexible band portion comprises one or more parallel spaced, continuous rows of scoring disposed around the circumference of the inner rim portion, wherein the spacing of each row of scoring in relation to the circumference of the inner rim portion and in relation to each other is variable; and adjustment means for fitting the headpiece to the wearer's head, said adjustment means comprised of proportionately spaced notches sized and positioned to render the flexible band portion adjustable to accommodate the size and shape of the wearer's head while maintaining the inner rim portion in an erect position and angled in relation to the planar portion while the headpiece is being worn; and
   further wherein one or more of the upper side or under side of the planar outer portion, the flexible band portion or the inner rim portion has readable information affixed by printing, stamping, gluing or fusing thereto; and the headpiece is disposed to be adjustably mounted on the head of a wearer to provide shade and to display the readable information.

2. The headpiece of claim 1, further comprising, as an integral feature of the inner rim portion, an elevated tab portion having thereon readable information, such that when the headpiece is placed on the head of the wearer the tab portion is deflected to an erect position, said erect position being disposed at an angle in relationship to the plane of the planar portion and the readable information is facing outward from the head of the wearer.

3. The headpiece of claim 1 wherein the entire headpiece is constructed from a material selected from the group consisting of paperboard, rigid or semi-rigid plastics, laminated fabrics, composite materials and combinations thereof.

4. The headpiece of claim 1 wherein the entire headpiece is constructed of paperboard.

5. A method of advertising goods and services comprising affixing readable information advertising the goods and services to one or more surfaces of a foldable, wearable headpiece comprising a planar outer portion; an inner rim portion, at least a portion of the circumference of which defines a center opening; a flexible band portion disposed between the planar outer portion and the inner rim portion; wherein:
   a. the planar outer portion includes
      i. an upper side and an under side thereof; and
      ii. an outer edge that defines the outer edge of the headpiece, wherein the circumference of the outer edge of the planar outer portion is sufficient to provide an area of shade that covers the face and neck of a wearer wearing the headpiece and to provide sufficient surface area to accommodate the affixing of readable information by printing, stamping, gluing or fusing thereto on the upper and under side of the planar outer portion; and
      iii. readable information that can be viewed or scanned by human, mechanical, digital or optical means, affixed to the upper and under side of the planar outer portion;
   b. the inner rim portion comprises an inner rim edge, the circumference of which defines a center opening to accommodate the head of the wearer, and is connected to the planar outer portion by the flexible band portion; and c. the flexible band portion comprises one or more parallel spaced, continuous rows of scoring disposed around the circumference of the inner rim portion, wherein the spacing of each row of scoring in relation to the circumference of the inner rim portion and in relation to each other is variable; and adjustment means for fitting the headpiece to the wearer's head, said adjustment means comprised of proportionately spaced notches sized and positioned to render the flexible band portion adjustable to accommodate the size and shape of the wearer's head while maintaining the inner rim portion in an erect position and angled in relation to the planar portion while the headpiece is being worn; and wherein the readable information is affixed to one or more of the upper side or under side of the planar outer portion, the flexible band portion or the inner rim portion such that all the readable material is visible to others when the headpiece is being worn.

6. The method of claim 5 wherein the readable information is affixed to the upper side and under side of the planar outer portion and the one or more surfaces of the flexible band portion or the inner rim portion by a printing technique selected from include offset, flexography, screen printing, digital press, chromolithography or 3-D printing.

7. The method of claim 5 wherein the headpiece is comprised of a base material selected from the group consisting of paperboard, plastic, foam board, lightweight composite materials, fabric-covered materials and combinations thereof.

\* \* \* \* \*